Feb. 3, 1948.  B. L. KLINE ET AL  2,435,223
MEANS FOR PRODUCING FACSIMILE TELEGRAPH SIGNALS
Filed Feb. 26, 1944

RELATIVE SENSITIVITY OF PHOTO CELL

WAVELENGTH-MILLIMICRONS

VISIBLE — INFRA RED

INVENTORS
B. L. KLINE
R. W. HARRIS
BY
ATTORNEY

Patented Feb. 3, 1948

2,435,223

UNITED STATES PATENT OFFICE 2,435,223

MEANS FOR PRODUCING FACSIMILE TELEGRAPH SIGNALS

Bernard L. Kline, Manhasset, and Robert W. Harris, Garden City, N. Y., assignors to The Western Union Telegraph Company, New York, N. Y., a corporation of New York Application February 26, 1944, Serial No. 523,966

1 Claim. (Cl. 178—7.1)

This invention relates to an improved means for producing facsimile telegraph signals by a light sensitive cell which operates in accordance with variations in the amount of light received by the cell as determined by the light and dark portions of the subject matter to be transmitted.

In facsimile transmitting systems involving optical pickup apparatus, a suitable source of energizing light, such as a tungsten filament lamp, is employed for energizing a photoelectric cell such as a caesium cell, in accordance with the subject matter to be transmitted. A sheet of paper or other blank bearing markings comprising the subject matter, such as pictures, drawings or characters of a message for transmission by the facsimile process, is arranged so that relative movement between the energizing light and the sheet is produced by known scanning mechanism whereby a pencil of light from the source is projected successively onto elemental areas of the subject matter sheet. In areas of the sheet which do not contain markings, the light is reflected onto the photocell throughout the entire frequency range of light from the energizing source, the reflection of the light from the unmarked portions of the sheet assuming substantially equal intensity for all components in the light source.

Assuming that the subject matter for transmission by the facsimile process is composed of black or dark colored characters on white or light colored paper, the result of the scanning process is as follows. When the incident light falls on the unmarked background of the sheet, a high percentage of the incident light is reflected from the paper and collected by the photocell, causing a change in the output of the transmitting circuit from that of minimum incident light condition. If the relative movement between the sheet and the light source causes the pencil of light to be incident on a black or dark colored elemental area forming part of the markings comprising the subject matter to be transmitted, a portion of the light is absorbed by the marked area and a portion is reflected onto the photocell. Since the output of photocell at any instant is dependent upon the amount of light directed onto its collecting element, the quantity of light reflected from the marked area should be as small as possible in order to produce suitable signals representative of such areas. If the subject matter to be transmitted is delineated by means of an ink on the reflective surface of the paper sheet, and the ink has the property of absorbing only a relatively small portion of the incident light, the electrical output of the photocell when the light is incident on one of the characters of the subject matter will not differ greatly from the electrical output of the cell when the light is incident upon the reflective surface of the paper sheet. The resulting record produced at a recorder responsive to signals generated by the photocell will not have sufficient contrast between the two levels. If the photocell were equally responsive to all wave lengths of light, any dark colored mark on the transmitting blank would suffice; the sensitivity of the photocell, however, is much greater in the spectral region above 625 to 650 millimicrons, which is approaching the end of the visible spectrum, and therefore it must be absorptive of wave lengths which activate the photocell irrespective of how the mark may appear to the eye.

Many marking substances such as inks derive their characteristic colors from dyestuffs. To the eye, a character written, printed or otherwise impressed on the reflective surface of the paper sheet with such inks may appear to be quite dark as compared to the white or light colored background of the sheet because a portion of the visible light corresponding to the characteristic color of the dye is reflected to affect the eye. The infra-red content of the incident light reflected from the area in question is not visible and therefore does not affect the eye, but it does affect the photocell within the range of its greatest spectral sensitivity. Substantially all known dyestuffs have the property of readily transmitting wave lengths corresponding to the invisible infra-red rays which will be reflected in large measure by the paper underneath the dye marking and will be transmitted back through the dye marking to be incident on the greatest radiation sensitive portion of the photocell. Thus the infra-red rays tend to activate the photocell to an extent such that there is very little difference in the energy contained in the light reflected from unmarked areas of the paper sheet and from areas of visually dark characters produced by the dyes, and hence the ability of the photocell to distinguish sharply between marked and unmarked areas is greatly impaired.

An object of the invention is a more suitable means for deriving facsimile and other signals by a photoelectric cell which scans the marked and unmarked elemental areas of the subject matter sheet during the transmission of signals representing such subject matter.

Another object is a means for causing, in a system of the character disclosed, wide variations in the response of a transmitting photoelectric cell to the marked and unmarked elemental areas, respectively, of the subject matter sheet scanned by the photocell.

An additional object is to increase the accuracy of the signals transmitted in a system of the character disclosed and to produce sharp and fine definition of the subject matter transmitted and recorded in facsimile.

A further object is to provide a more suitable marking substance for forming on a subject matter sheet marked areas which delineate the subject matter so as to enable signals to be transmitted in accordance therewith, and more particularly to such a marking substance which has a spectral absorption curve that substantially peaks or shows high absorption values within the range in which the spectral sensitivity of the photoelectric cell reaches high values.

Other objects and advantages will be apparent from the following description taken in connection with the accompanying drawings, in which:

Fig. 1 schematically illustrates a facsimile system in which the present invention may advantageously be employed;

Figure 1:
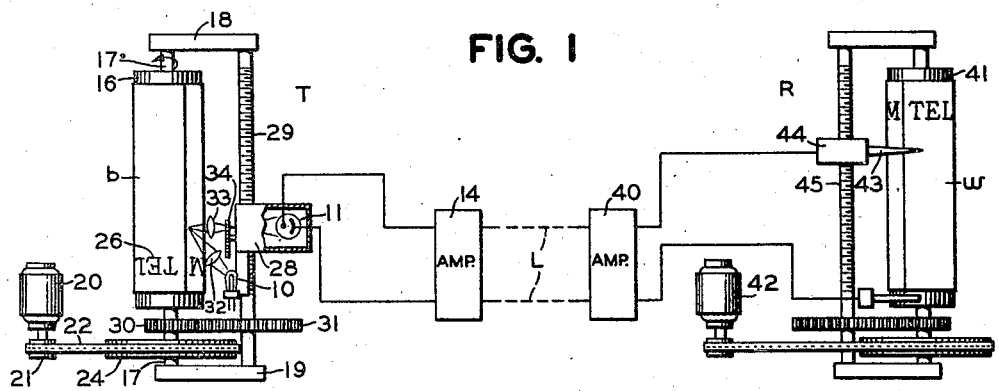
Figure 4:
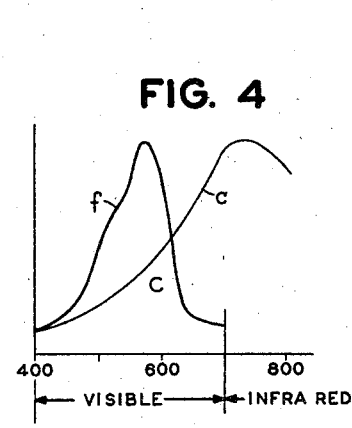
Fig. 4 shows a spectral absorption curve of a marking substance which does not peak within the useful range of the photoelectric cell sensitivity curve, and which therefore is not suitable for facsimile transmission purposes.

The principle of the invention and its application to an optical pickup system useful in a facsimile telegraph scanner or other signal generating device will be explained with reference to Fig. 1 and the curves of Figs. 2 to 4. In Fig. 1 the transmitter T includes a suitable energizing light source 10 and a radiation sensitive device having more or less selective sensitivity to portions of the radiant light energy lying within the spectrum emitted by the source 10. The radiation sensitive device 11 may be any of the well known types of photo or radiation sensitive cells or tubes heretofore proposed in the art and hereinafter referred to as a photocell. The source 10 is usually a tungsten filament lamp which has a "white" light output composed of the various colors of the visible spectrum plus invisible components extending into the infrared region. The term "light" will be used hereinafter as synonymous with the total radiation from the light source 10. The photocell 11 is sensitive to these different color components which make up the scanning light and is employed to translate the reflected light into electrical energy in the form of signals appearing in the output circuit of an amplifier 14. The scanning equipment of the transmitter includes a rotatable cylinder 16 carried by a centrally disposed driving shaft 17 which is journaled in frame members 18 and 19. When transmitting signals the cylinder is rotated, in the direction indicated by the curved arrow, by any suitable means such as an electric motor 20 preferably of the alternating current synchronous type which is connected, in the illustrative form shown, by a driving pulley 21 and a belt 22 to a driven pulley 24 keyed to the shaft 17. To prevent slippage, the pulleys have pins thereon which are received in slots in the belt as indicated.

The characters or images 26 comprising the subject matter, for example a telegram to be transmitted, may be written, typed or otherwise applied to the transmitting sheet $b$ by means of a marking substance having suitable spectral absorption characteristics as hereinafter disclosed. The sheet is then wrapped once around the cylinder 16 in the manner shown in the figure, and releasably secured to the cylinder in any suitable manner.

The scanning apparatus, which comprises the source of light 10 and the photocell 11, is supported by a traveling carriage 28 adapted for movement longitudinally along a rotatable shaft 29 screw-threaded throughout the greater part of its length, the shaft being rotated by driving gears 30 and 31, keyed to the shafts 17 and 29, respectively, whenever the cylinder 16 is rotated. Thus, the optical pickup scanning apparatus, including the lamp 10 and photocell 11, is caused to traverse the cylinder in a longitudinal direction (away from the observer as viewed in Fig. 1) as the cylinder rotates, the pitch of the thread on the shaft 29 determining the extent of longitudinal traverse of the pickup mechanism during each rotation of the cylinder.

The light from the source 10 passes through a condensing lens 32 so that a pencil of light impinges successively upon elemental areas of the subject matter blank $b$ as the cylinder rotates. The light reflected from the blank passes through a condensing lens 33 and a rotating light chopper 34 which modulates the beam of light received by the photocell in the manner and for the purpose disclosed in Patent No. 2,158,391, issued May 16, 1939, and No. 2,176,442, issued October 17, 1939, the disclosures of which are incorporated herein by reference. While only one photocell is illustrated in Fig. 1, preferably two such cells are employed to permit reception of a positive record from a positive representation of a picture or message, as disclosed in the aforesaid patents, although one photocell may be used and the signals inverted either at the transmitting or receiving end in a manner well known in the art. When the scanning light is incident on a black or dark colored elemental area formed from a marking compound in accordance with the invention, the absorption of the light by the marked area changes the output of the photocell and causes electrical oscillations to be impressed upon the input circuit of the amplifier 14. The signals are suitably amplified in the amplifier 14 and then pass over a line L to a receiver R.

At the receiving end the recording may be accomplished by any of the various known methods suitable for the purpose. The embodiment illustrated in Fig. 1 shows one method of recording in which a paper web $w$ is mounted upon a rotatable cylinder 41 of substantially the same diameter as the cylinder 16 of the transmitter T. The cylinder 41 is rotated in synchronism with the sending cylinder 16 in any suitable manner, as by means of an alternating current synchronous motor 42 or other kind of motor which is kept in step with the sending motor 20 by any of the known methods of maintaining synchronism. The web $w$ preferably is impregnated or treated with a substance such that the application of electrical potential thereto causes passage of current therethrough to produce color changes or other marking effects in the substance of the web to record the subject matter transmitted. In the illustrative form shown the incoming signal currents are conducted to the web $w$ by means of a scanning stylus 43 arranged with its point in continuous contact with the web, the stylus being mounted on a carriage 44 resting upon a threaded shaft 45 rotated with the cylinder 41. The threaded shaft in combination with the rotation of the cylinder produces a helical scanning movement of the stylus 43 in the manner set forth with respect to the transmitter. If desirable or necessary, the incoming signals may be repeated and amplified in an amplifier 40 in a manner well known in the art to translate the signals into suitable current pulses to produce the received image. When synchronism of the rotating parts and scanning movements of the pick-up device of the transmitter and the recording stylus at the receiver is properly maintained, the image upon the blank $b$ at the transmitter will be reproduced in facsimile upon the web or blank $w$ at the receiver as scanning proceeds.

Heretofore when transmitting typewritten or other ink records by means of a facsimile system employing a photocell for scanning at the transmission end, it has generally been necessary to employ a carbon bearing ink to form the subject matter on the sheet in order to enable the photocell to distinguish between marked and unmarked areas. This method has several disadvantages, however, in that the life of the carbon black impregnated typewriter ribbon or carbon paper by means of which the characters are impressed on the transmitting blank is undesirably limited in regard to the time within which the record may be reproduced by photocell circuits relative to the record life of the ink, and moreover the carbon black ink, due to the particular character of the coloring matter which is composed of discrete particles, and because of its comparatively low tinctorial strength, does not produce an original record in sufficient continuity of detail for various purposes. Carbon black inks also are subject to the disadvantage in that, after a given portion of the typewriter ribbon or carrier sheet has been utilized for producing an original record, that portion of the carrier medium is not properly reimpregnated by flow of the ink from adjacent areas.

In accordance with the invention we employ a solution of a marking substance for forming the marked areas of the subject matter to be transmitted, the marking substance having a suitable spectral absorption curve that substantially peaks or shows high absorption values within the range of high spectral sensitivity of the photocell as to enable the photocell to operate at high efficiency. The solution penetrates and dyes the fibres of the paper blank in the marked areas and therefore produces continuity of detail to a degree not possible with the carbon black and other inks heretofore employed. Fig. 2 is a graph in which the abscissas represent wave lengths of light in millimicrons and the ordinates represent the relative spectral sensitivity of a photocell. The curve $c$ is a photocell sensitivity curve of the type of cell, such as a caesium cell, commonly employed in optical pick-up systems of the character disclosed, curve $c$ showing the response of such a cell to the various wave lengths of the total spectrum of the light emitted by the source 10. It will be seen that the photocell sensitivity curve peaks in the neighborhood of 725 millimicrons. The curve $d$ represents the spectral absorption curve of a suitable marking substance, and it will be seen that the absorption curve has high values within the range of useful spectrum sensitivity of the photocell to visible light rays. It will be apparent that the high value of absorption of the light energy which is measured by the common area A beneath the two curves $c$ and $d$, causes a corresponding increase in the signal strength when marked areas in accordance with the invention are scanned by the photocell.

Figure 2:
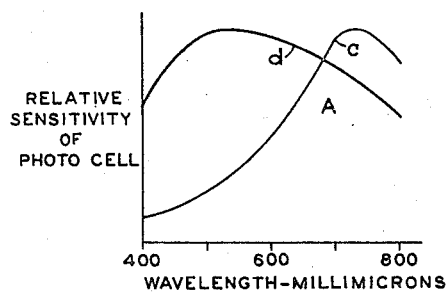
Figs. 2 and 3 show spectral absorption curves of suitable marking substances which peak or approach their peak values within a range of the photoelectric cell sensitivity curve such as to enable the scanning photocell to operate at high efficiency.

A marking compound which gives the spectral absorption curve $d$ of Fig. 2 may be prepared in the form of an ink. Preferably, although not necessarily, an oil vehicle is used, for example, a mixture of equal parts of mineral oil, lard oil and oleic acid, is employed, and in this oil vehicle is dissolved a dyestuff having a suitable spectral absorption curve. For example, a fatty acid salt such as the lauric acid derivative of Induline Blue Base may be employed, suitable proportions being one part of this blue paste color to one to four parts of the vehicle, either by weight or volume. The paste color may be dissolved in the vehicle either by grinding in a roller mill or by dissolving the paste in a tank of the oil vehicle, preferably with the aid of heat, to form a solution. The marking substance or ink thus compounded is non-aqueous and may be used to impregnate typewriter ribbons or other suitable carrier mediums, and since it is non-volatile it remains in the carrier medium for long periods of time without changing. The fluidity of the ink is such that when the ink has been taken from any portion of the carrier medium as by being struck by a typewriter key or other impression forming means, the ink in the adjacent portions of the carrier medium readily flows into the used areas and thus rejuvenates the carrier medium so that it is capable of a long and useful life. The viscosity of the ink may be varied within rather wide limits depending upon the nature of the carrier medium and the purpose and kind of transmitting record to be produced therefrom. The record ink above described has a pleasing dark blue color of high tinctorial strength and is substantially non-smudging and is capable of forming a transmitting subject-matter blank with sufficiently fine and sharp definition so that little of the record is lost when it is reproduced by a facsimile or other reproduction circuit employing a photocell for scanning at the transmitting end.

Figure 5:
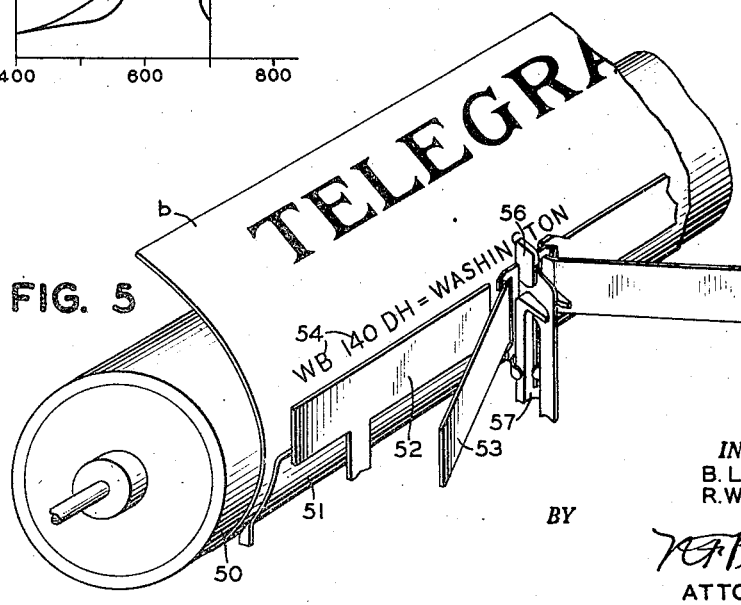
Fig. 5 illustrates how the characters comprising a message, having a suitable spectral absorption curve, may be typed on a telegraph blank for transmission.

Fig. 5 is a fragmentary view of a typewriter in which the transmitting blank $b$ is placed adjacent the platen 50, the blank passing between the platen and a paper guide 51 and a line guide 52. The marking compound is applied to the typewriter ribbon or tape 53 by impregnating or otherwise treating the same therewith, and the letters or characters 54 are struck by type bars 56 which pass between a type bar guide member 57 to strike the typewriter ribbon against the sheet $b$ and impress thereon the characters carried by the type bars.

It is desirable in many instances to provide a marking compound or ink such that numerous wet press copies may be made from the original record blank $b$, and that such wet press copies also be adapted for scanning and reproduction by photocell systems such as the one disclosed. For this purpose the ink above described may have added thereto a substantial quantity of a water soluble dye, for example, Methylene Blue dye, that has a spectral absorption curve which peaks substantially within the range of the sensitivity curve peaks of the photocell. Preferably, only a small portion, if any, of the Methylene Blue dye is dissolved in the ink, and a large quantity of undissolved Methylene Blue dye is ground up and dispersed as a pigment in the ink. The undissolved quantity of Methylene Blue is not readily visible in the original copy, nor is it required to be, but when wet press copies are made the undissolved portion of the Methylene Blue is dissolved by contact with the dampened or wet press tissues, and two things happen: (1) the tissue gets the impression in Methylene Blue in such quantity as to produce fine and sharp definition of the wet press copy, and (2) the Methylene Blue left in the original record dissolves somewhat and leaves its color on the original so that both the original and the wet press copies made therefrom are especially suitable for activating a photoelectric cell.

Figure 3:
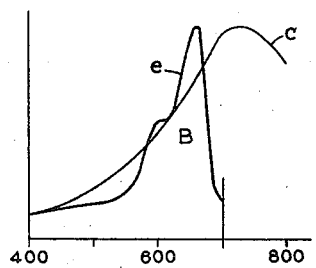

Fig. 3 shows the spectral absorption curve $e$ of the Methylene Blue marking substance above referred to, and it will be seen that the absorption curve of this substance peaks within a range of the photocell sensitivity curve $c$ such that the major portion of the visible light rays from the source 10 are absorbed by the Methylene Blue and that this absorbed portion which is measured by the common area B beneath the two curves, lies within the useful range of the photocell sensitivity curve. The energy thus absorbed by the characters or other subject matter composed of the Methylene Blue causes sufficient absorption of the visible light rays as to enable the scanning photocell to have a high selective action as between the marked and unmarked areas of the transmitting sheet.

A formula containing the Methylene Blue which has been found very satisfactory in practice is as follows: one part of Methylene Blue dye, one-twentieth part of the dark blue paste, and from one to four parts of the oil vehicle. In this formula the dark blue paste content may be reduced because the undissolved Methylene Blue powder serves as a pigment, affording good record visibility and making unnecessary the higher content of dark blue paste. The proportion of the dark blue paste and the Methylene Blue dye may, however, be varied within rather wide limits as determined by the desired fluidity of the resultant ink and the purpose for which it is to be used. It is desirable to use as much Methylene Blue as can conveniently be introduced into the ink in order that the copying life of the ink may be increased to a point where it substantially equals the record transmission.

The Methylene Blue and lauric acid derivative of Induline Blue base hereinbefore referred to are commercially obtainable from the General Dyestuffs Corporation under the trade designations, respectively, of "Methylene Blue JFA" and "Spirit Dark Blue Paste S."

While a marking substance produced in accordance with the foregoing has a pleasing dark blue color, and has good opacity and contrast characteristics, it may be desirable for certain purposes to add or substitute other dyes or pigments to produce different colors or shades, it being understood, however, that in photocell transmission a color should be used which has suitable tinctorial strength and whose spectral absorption curve causes a large amount of incident light to be absorbed within the useful range of the photocell sensitivity curve, that is, above approximately 650 millimicrons, as to enable the scanner to differentiate sharply between marked and unmarked elemental areas of the subject matter. For example, Methyl Violet, which is ordinarily employed in copying inks, peaks at about 580 millimicrons, and as shown, by its spectral absorption curve $f$ in Fig. 4, and the limited extent of the common area C below the curves $c$ and $f$, it is unsuitable for photoelectric scanning since only a very small portion of the light within the useful range of the photocell sensitivity curve is absorbed by such a compound.

There are several Methylene Blues known in the trade which have high tinctorial strength, with the peaks of their spectral absorption curves ranging from about 660 to 675 millimicrons, and which are especially satisfactory for the purpose. Dyes such as those commercially designated in the trade as "Pontacyl" Brilliant Green 10G, Naphthol Green B, and an iron blue known as "Soluble Blue" have suitable absorption spectra, and may also be used, but due to their lower tinctorial strengths are not preferred.

In the specific embodiment illustrated, the photocell is activated by reflected light from the surface of the subject matter blank, but the invention is equally applicable when the scanning light is transmitted through the blank in well known manner.

It is to be understood that the foregoing specific examples given are for the purpose of illustrating the principles of the invention, and that the invention is not limited except as indicated by the scope of the appended claim.

What is claimed is:

In a facsimile transmission system for deriving signals from a subject matter blank, a source of scanning light rays having high energy in the visible spectral region adjoining the infrared part of the spectrum and also in the infrared region, a photocell having high sensitivity to visible and invisible light in the region above approximately 650 millimicrons, a subject matter blank interposed between said light source and photocell and characterized in that the unmarked areas of the blank have low spectral absorption properties in the infrared region, the marked areas of the blank being delineated by a marking substance in solution having high spectral absorption properties to visible light in the region above approximately 650 millimicrons thereby to cause the photocell to distinguish sharply between the marked and unmarked areas on the blank notwithstanding the high energy of the infrared rays incident thereon from both areas.

BERNARD L. KLINE.
ROBERT W. HARRIS.

REFERENCES CITED

The following references are of record in the file of this patent:

UNITED STATES PATENTS

| Number | Name | Date |
| --- | --- | --- |
| 1,325,971 | Akaski | Dec. 23, 1919 |
| 2,138,836 | Brower | Dec. 6, 1938 |
| 2,172,465 | Demarest | Sept. 12, 1939 |
| 2,351,231 | Ridings | June 13, 1944 |

OTHER REFERENCES

Henney, Electron Tubes in Industry, McGraw-Hill, Jan. 1937; pages 308 and 309.

Ellis, Printing Inks, Rheinhold Pub. Co., 1940; page 417.